(12) United States Patent
Barlow et al.

(10) Patent No.: US 6,782,311 B2
(45) Date of Patent: Aug. 24, 2004

(54) REMOTELY CONTROLLED IRRIGATION TIMER WITH FAULT DETECTION

(76) Inventors: Jame E. Barlow, 8470 W. La Mancha Ave., Las Vegas, NV (US) 89149-3935; Edward S. Pattiani, 2814 Water Sport Ave., North Las Vegas, NV (US) 89031

( * ) Notice: Subject to any disclaimer, the term of this patent is extended or adjusted under 35 U.S.C. 154(b) by 0 days.

(21) Appl. No.: 10/216,498

(22) Filed: Aug. 10, 2002

(65) Prior Publication Data

US 2004/0030456 A1 Feb. 12, 2004

(51) Int. Cl.$^7$ .................................................. G05D 7/00
(52) U.S. Cl. ........................ 700/284; 238/68; 238/69; 238/70
(58) Field of Search ........................... 700/284; 238/68, 238/69, 70; 137/624.11

(56) References Cited

U.S. PATENT DOCUMENTS

| | | | | |
|---|---|---|---|---|
| 4,244,022 A | * | 1/1981 | Kendall | 700/284 |
| 4,837,499 A | | 6/1989 | Scherer | |
| 4,852,802 A | | 8/1989 | Iggulden et al. | |
| 4,962,522 A | | 10/1990 | Marian | |
| 5,048,755 A | * | 9/1991 | Dodds | 239/68 |
| 5,097,861 A | | 3/1992 | Hopkins et al. | |
| 5,139,044 A | * | 8/1992 | Otten et al. | 239/68 |
| 5,208,855 A | * | 5/1993 | Marian | 239/69 |
| 5,696,671 A | * | 12/1997 | Oliver | 700/284 |
| 5,870,302 A | | 2/1999 | Oliver | |
| 6,298,285 B1 | | 10/2001 | Addink et al. | |
| 6,314,340 B1 | | 11/2001 | Mecham et al. | |
| 6,343,255 B1 | | 1/2002 | Peek et al. | |
| 6,402,048 B1 | * | 6/2002 | Collins | 239/69 |

OTHER PUBLICATIONS

AWS Convergence Technologies Home page from their web site current version 2003.
Rainbird Corporation MAXICOM central irrigation control system referred to by OLIVER reference.
Rainbird Corporation Flow sensors and Flow sensing systems.
Rainbird CorporationWS–PRO dedicated weather station for large irrigation systems.
Rainbird IM series irrigation controller system showing flow sensing and auto shut–off.

* cited by examiner

*Primary Examiner*—Albert W. Paladini

(57) ABSTRACT

Method and apparatus for analyzing current microclimate weather data and generating watering schedules according to present need. This method and apparatus further transmits these watering schedules to receivers within individual irrigation timers to adjust water application and saver water. Microclimate weather data is applied to each irrigation timer according to actual local watering need. Water supply flow and starting times are adjusted to distribute delivery loads on water pumping stations. Whereas each individual irrigation timer starts and stops independently in accord with the latest received schedules, immediate control is always available to the transmitting authority.

9 Claims, 3 Drawing Sheets

Irrigation Controller 7 — Figure 2

REMOTELY CONTROLLED IRRIGATION TIMER WITH FAULT DETECTION

This method and apparatus has not been conceived or developed with Federal aid.

BACKGROUND OF THE INVENTION

Method and Apparatus for wide area remote scheduling of an unlimited number of individual irrigation timers enabling precise control of water used for landscape purposes. This method and apparatus solves a serious water waste problem that has not been addressed in practical terms by others. There exist a myriad of systems purported to save water but none actually solve the problem on a scale needed to make a significant contribution to water conservation.

1) Field of the Invention

This method and apparatus permits large-scale manipulation of individual residential and small commercial irrigation controllers by a single scheduling agency. A data processing center calculates watering schedules in step with present microclimate weather conditions specific to localized neighborhoods using current weather data and evapotranspiriation rates for different soil and plant types.

2) Prior Patents

Adaptive, self learning, embedded micro controllers are shown And disclosed in U.S. Pat. Nos. 6,314,340; 6,298,285. That or similar technology may be used in the method and apparatus disclosed. Moisture sensing feedback technology are in U.S. Pat. Nos. 4,837,499; 4,852,802. In '499 a moisture sensing device for an irrigation system is disclosed. A pair of concentrically disposed cylindrical conductors are separated by a fibrous material, such that a capacitor is formed and resistance varies in response to the level of moisture present in the fibrous material. An electrical circuit is connected across the cylindrical conductors for measuring the variable resistance caused by the level of moisture present in the fibrous material. If the soil is dry enough to require watering, the sensor circuit will produce an output signal to the appropriate solenoid in the irrigation system to permit watering.

In '802 localized moisture requirements are input to the control function. A sprinkler head connects to a supply of water under pressure by a pipe having a valve therein and a moisture sensing probe placed in the soil adjacent the sprinkler head that signals moisture content of the soil surrounding the probe. Irrigation logic in the probe activates the valve. The probe compares the moisture content of the soil surrounding it to pre-established limits and for preventing the valve from supplying water to the sprinkler head when there is sufficient moisture in the soil. The valve is electrically operated and a timer controller supplies power to the valve at pre-selected times adjusted to pre-established limits to suit the particular watering needs of the area. Wireless operation is provided by a receiver at the timer controller for a radio frequency signal to prevent supplying power to the valve. A transmitter at the probe transmits the signal when there is sufficient moisture in the soil. Where there are a plurality of valves connected to the timer controller in the wireless version, there are identification code recognition included within the receiver for disabling only the valve associated with an identification code appended to the radio frequency signal. Identification code addition included within the transmitter appends a unique identification code associated with the valve controlling the associated sprinkler head to the radio frequency signal when transmitting the signal. A supplemental valve in a pipe supplying water to one or more sprinkler heads subject to the irrigation bypass logic so flow of water to the individual sprinkler heads is stopped when no water is needed in the area watered. The supplemental valve is in a riser pipe directly connected to a single sprinkler head. A rechargeable battery supplies power to the irrigation bypass logic and solar panel recharges the battery.

Pre-stored evapotranspiration rates with local moisture sensors is taught in U.S. Pat. No. 5,097,861. In '861 a plurality of selectively actuable watering stations are spaced about a selected location such as a lawn and/or garden and are connected to a source of pressurized water. A set of data is stored representing environmental conditions of the selected location the conditions being selected from the group of evapotranspiration rates for predetermined intervals throughout a given time period, and temperature and precipitation rates for predetermined intervals throughout a given time period. Another set of data is provided from at least one input device at the selected location, the input device being selected from the group of a temperature sensor, a rain gauge, a humidity sensor, and a flow meter. Each watering station is actuated for predetermined durations at predetermined intervals based upon the data representing environmental conditions and the input device data to thereby ensure optimum growth of the plants situated in the selected location. A non-watering period may be designated for each of the watering stations to thereby determine an available watering period for each of the watering stations. Each watering station is thereafter only actuated within its corresponding available watering period. The user enters the times when the system is not supposed to water and the control system calculates the necessary water schedule based upon parameters previously entered by the user. With enough environmental and geographical data about the installation site, accurate watering schedules can be calculated. Soil moisture sensors are not needed to satisfy the water requirements for most turf and plant materials. The stored data tables contain information about monthly mean temperature and evapotranspiration rates for each section of the United States and Canada. The data tables actually contain twelve values of E.T. or temperature per ZIP Code area. This data when used with the user supplied variables such as grass type, soil intake rate, station's precipitation rate and time "not to water," is used by the control system to calculate water schedules for each output station. Thus, water schedule calculations are based on stored constants in ROM tables in conjunction with user supplied variables which also become part of the permanent data base. The evapotranspiration and temperature information contained in the ROM data tables are data which is history that represents the "mean monthly value" for each ZIP Code in the United States (twelve values per ZIP Code). To complete the required data base information in the preferred embodiment, the user has the responsibility of providing the station's precipitation rate (inches per hour), soil intake (inches per hour) and the grass coefficient (multiplier factor of 0.6 to 1).

Internet or cellular data communication is in U.S. Pat. No. 6,343,255. Broadcast wide area weather data is discussed in U.S. Pat. No. 5,208,855. In '855 there is automatic remote control of irrigation sprinklers using evapotranspiration values. A transmitter broadcasts updated evapotranspiration data directly to a collection of receiver/controller units using an FM sub-carrier. These receiver/controller units are microprocessor-based and coupled to a set of irrigation sprinklers. The method provides for broadcasting an encoded data signal to a collection of receiving and irrigation-controlling units. The receiving and irrigation-controlling units include microprocessors and storage for storing a preset evapotranspiration zone reference and crop adjustment values. The method also includes receiving and decrypting an encrypted broadcast data signal into an evapotranspiration zone identifier and a corresponding evapotranspiration value. The method further compares the broadcast evapotranspiration zone identifier with the preset evapotranspiration zone reference. The method adjusts an irrigation flow quantity responsive to the broadcast evapotranspiration value, scaled by the crop adjustment value, when the broadcast evapotranspiration zone identifier matches the preset evapotranspiration zone reference. Thus broadcasts of coded evapotranspiration values and corresponding evapotranspiration zones directly to a collection of intelligent, microprocessor-based irrigation sprinkler controllers located over a wide geographic area are disclosed. These controllers then produce an adjustment value responsive to the broadcast evapotranspiration data for a particular evapotranspiration zone. Other broadcast methods, such as direct satellite transmission or preexisting paging systems could be used. A special receiver selectively receives the evapotranspiration broadcast, meaning that the receiver only responds to evapotranspiration information for a particular preset zone. The receiver is microprocessor-based. The receiver extracts evapotranspiration information associated with the particular zone and automatically adjusts the sprinkler intervals to deliver the proper amount of water. The sprinkler controller is responsive to the updated evapotranspiration information and is also responsive to preset crop- and irrigation-specific information about the particular crop, that is, the crop coefficient. The system is fully automatic, requiring negligible intervention by the various users.

In this invention the source of current weather data is not defined, the controllers are only addressable by "ET Zone" and no immediate direct control is possible.

A method of radio transmission useful with the present method and apparatus is presented in U.S. Pat. No. 4,962,522 however the control input is too cumbersome and the scope of application is clearly limited. Central processing of evapotranspiratiion rates are found in U.S. Pat. No. 5,870,302. A system and method uses evapotranspiration and/or predicted precipitation data in controlling automated and semi-automated irrigation systems. Meteorological data is monitored and used to adjust watering schedules for an irrigation site. A central computer uses the data and evapotranspiration to compute a watering factor to adjust a reference watering schedule stored at the irrigation site to a new watering schedule. The watering factor is sent to the irrigation site to modify the reference watering schedule. Alternatively, meteorological data and site characteristics can be monitored at the irrigation site and sent to the central computer, which then computes the watering factor based on this specific site information. The computed ET data is preferably based on a current prediction of future events based upon present meteorological conditions. The host computer may be coupled to the site control devices by wireless links, such as radio or microwave, or may be hard-wired together, such as by telephone lines. Alternatively, the host may be coupled (either by wireless link or hardwired) to a single site control device, which may be in turn coupled to one or more "satellite" site control devices. A "closed loop" system in which meteorological (and even other) data may be collected and stored by each of the site control devices and sent to the host computer and incorporated into the computation of the watering factor. In loop the host computer can be configured such that it computes a unique watering factor for each site and irrigation zone within the site.

Notwithstanding the preceding teachings all incorporated by reference and made a part hereof, no method and apparatus to individually and periodically control or adjust watering schedules according to current microclimate data on a site by site basis is suggested, proposed or disclosed in these patents or any motivated combination of them.

INVENTION SUMMARY

The greatest amount of water waste during irrigation (hence greatest potential for conservation) is over watering residential and small commercial landscape. This method and apparatus economically permits professional operation of an unlimited number of individual residential and small commercial irrigation controllers from a central location. In the preferred embodiment, microclimate weather date is collected from commercially operated local neighborhood weather station networks. An example would be local TV stations that operate such weather networks for their news programs. From that disparate weather data collected new watering schedules are calculated using commercially available techniques. For example, "REF-ET Reference Evapotranspiration Software" available from the University of Idaho can be used. The calculated watering schedules are unique to the microclimate of each neighborhood. These newly calculated watering schedules are then periodically distributed via mass broadcast (preferably using existing UHF pager signal transmission) for receipt by individually addressable irrigation timers throughout a large geographic area. Information is taken from the pager transmission signals by a receiver in each individually addressable irrigation timer and is used to update the watering schedules as required. Watering amount, scheduling or timing and frequency and immediate direct control are parameters that can be adjusted or operated remotely.

DETAILED DESCRIPTION OF THE INVENTION

Figure 1:
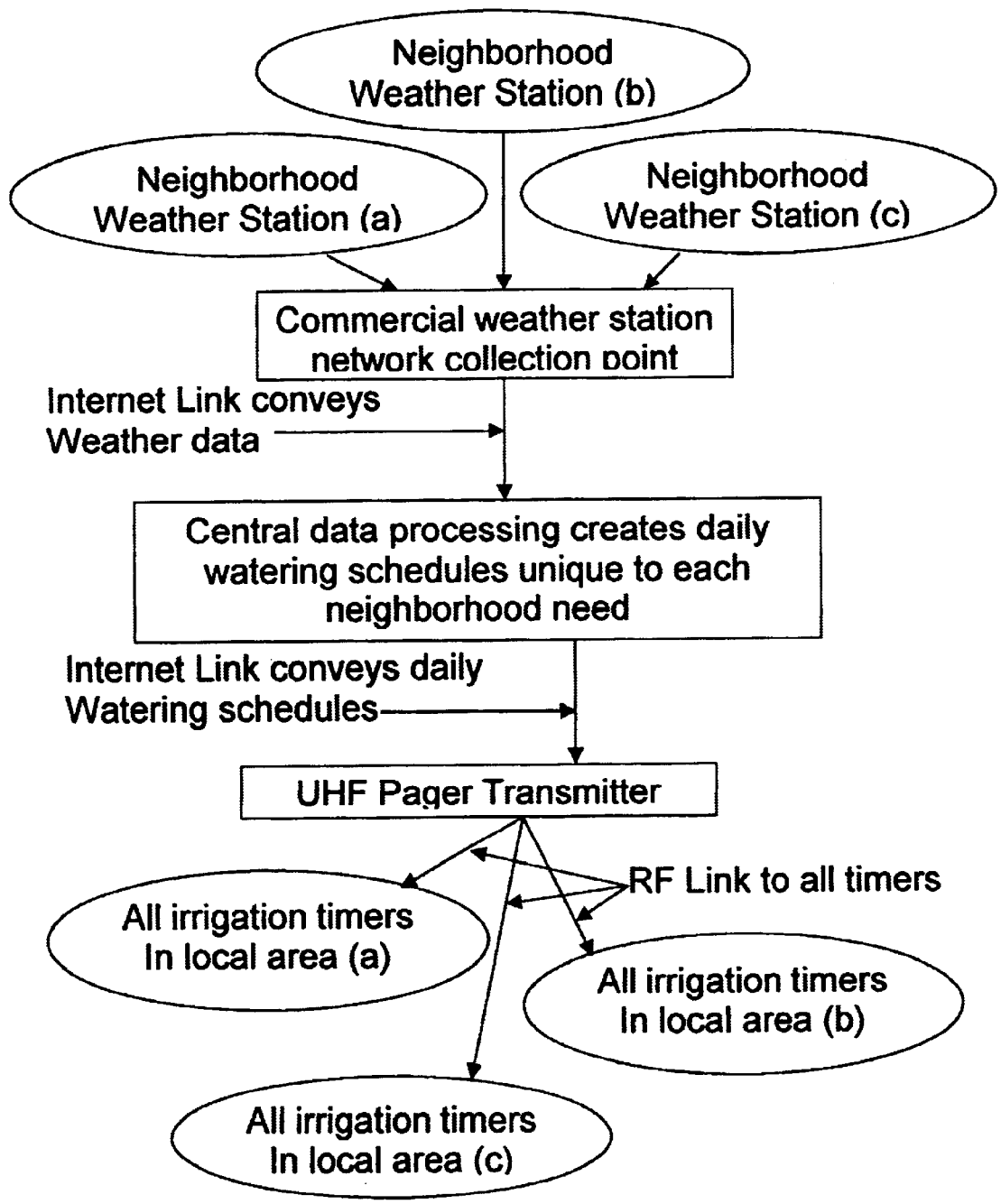
FIG. 1 is a schematic block diagram of the overall system for local irrigation control in accord with microclimate weather data.

In FIG. 1 microclimate weather data is typically provided by a commercial network of neighborhood weather stations from which real time weather measurements are collected. Wind speed, wind direction, humidity, temperature, Solar radiation and rain amounts are parameters that are in the data collected. This part of the method and apparatus is conveniently in place and operating in most metropolitan areas for commercial purposes. No automatic active application of that weather data is made to adjust each residential or small commercial irrigation system.

Using this microclimate weather data and known local plant water needs, new watering schedules are calculated with commercially available personal computer software noted herein. Watering schedules unique to each local area where the various neighborhood weather stations are located can be calculated and broadcast. Frequency of updating the watering schedules to stay in step with daily, weekly or seasonal weather changes can be adjusted as required. It is intended that this part of the system be manned 24 hours per day, 7 days per week so that response to changing weather conditions may be cared for immediately. This is especially important for those occasions where pumping system failures or other emergencies may exist.

When the new updated watering schedules are calculated, they may be encrypted for security, and sent via Internet to a UHF pager transmission facility for broadcast to the entire area from which the microclimate weather data was obtained. Since this type of transmission facility is already in place, the watering schedules can be broadcast at modest cost without significant investment in capitol equipment. The recognition of this capability (the overall system herein disclosed) and its use is unknown and not used. So as set forth in this disclosure that broadcast of watering schedules related to available microclimate weather data for water saving purposes taught herein is novel and useful.

All irrigation timers of this method and apparatus may preferably be tuned to a selected frequency to receive the pager transmissions and respond to universal instructions (applicable to all timers), or commands especially for a region, local area, or even instructions unique to an individual timer.

Figure 2:
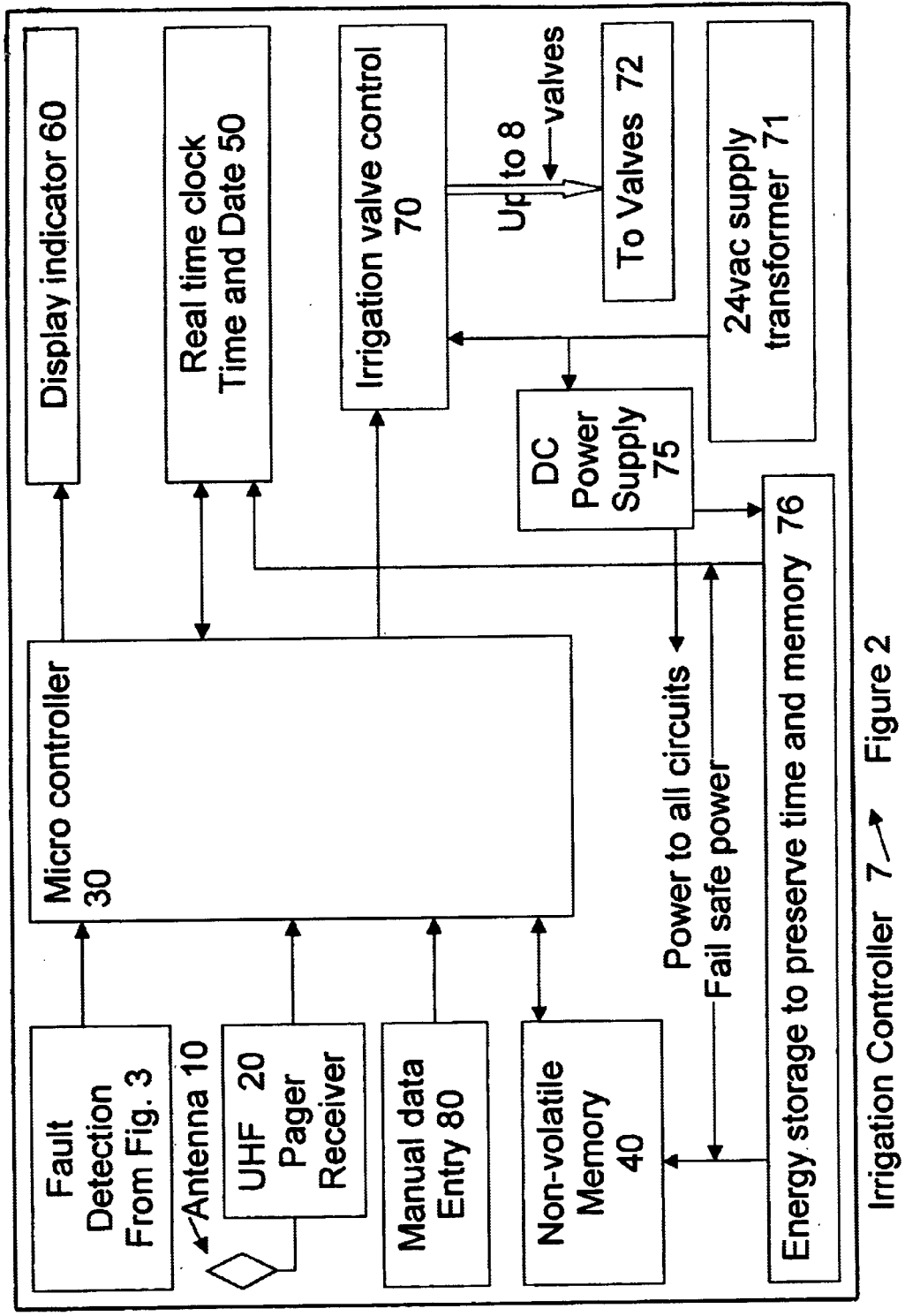
FIG. 2 is a functional view of the individually addressable controller or irrigation control timer for each residential or small commercial application.

FIG. 2 depicts the principle of operation of an individual irrigation timer 7 located in each residence or small commercial facility. Specifically, antenna 10 captures a signal from preferably a pager transmitter. Circuits in receiver 20 amplify and present the demodulated but still encrypted signal as output. As antenna 10 and receiver 20 of timer 7 are commercially available components for UHF reception, their detailed operation is not disclosed herein. An example of an "off-the-shelf" receiver is the Motorola "creataLink FLX" receiver.

Micro controller 30 is coupled to receive output from receiver 20. Micro controller 30 operating under programmable instructions stores the encrypted data in non-volatile memory 40 as it is received for further processing after each broadcast is complete. When each broadcast is complete, micro controller 30 retrieves the encrypted data from the non-volatile memory 40, decrypts it, separates the various components of time, date and watering schedules and returns this data to memory 40. A process of encryption and decryption is detailed in the well-known "AES" encryption standard and is not further discussed. Moreover, further information about the AES encryption standard may be found at the Internet web site www.csrc.nist.gov/encryption/aes/. Although others may be used a preferred micro controller 30 would be Maxim DS87C530 that also includes within itself the non-volatile memory 40, and Real Time Clock 50.

When an incoming signal has been decrypted and separated into its component parts of time, date, and watering schedules, the internal real time clock 50 is set to the current time thus keeping it accurate, and the watering schedules are stored back into the nonvolatile memory 40 wherein they will now be used to define both the start time and duration of water application for each station.

Micro controller 30 compares the time from the real time clock 50 to the stored schedules in non-volatile memory 40 to initiate the watering sequence as instructed by the stored schedules. In the normal fashion for valve control 70, each station operates sequentially only starting after the completion of the previous stations cycle.

To prevent all irrigation timers from starting simultaneously, micro controller 30 in each irrigation timer is programmed to use the last 4 bits of its unique serial number to alter the start time in 16 different 20 second increments. Since the stagger codes are derived from the last 4 bits of the individual irrigation timers unique serial number, they will be somewhat randomly distributed in each local area where many such irrigation timers are installed. In this manner, a single local area will have its total number of installed timers operating on 16 different start times separated by 20 seconds to spread the load on the water providers pumping equipment. Valve control 70 utilizing circuits common to existing irrigation timers that send a small current from a 24-volt alternating current transformer 71 to activate individual valve solenoids 72 for each watering station. The 24-volt transformers are readily available commercial items common to the irrigation timer industry and are not herein explained. Most hardware and home supply stores offer a variety of these transformers for use with current irrigation timers.

Power supply 75, using AC power from transformer 71, provides low voltage direct current power to the receiver 20, micro controller 30, memory 40 and the real time clock 50. Battery 76 prevents loss of schedule data in the event of power failure.

Display 60 indicates the time of day, date, station offsets and manual entry guide prompts and other data useful to the operation and maintenance of the irrigation timer. Micro controller 30 directly controls display 60.

Manual input keypad 80 permits personalization of schedule timing via additive or subtractive offsets entered for each station in timer 7. The offsets are entered as a percentage of the main schedule sent by the central processing facility and can preferably be increased or decreased in five percent increments. Once an offset is entered for a particular station the micro controller 30 adjusts the duration time for that station by the offset value. Thus actual water application can be uniquely adjusted to suit individual needs. Additionally for steeply sloped areas, or newly seeded areas, station timings can be split into user selected number of sub schedules of one the appropriate fraction of the application time to prevent seed washout or excessive runoff while still providing adequate water to keep the newly planted areas moist.

For recreational use, mowing or other maintenance, the schedule can be delayed for a specified period or even cancelled for one day. If cancelled, micro controller 30 to compensate for the missed water application may automatically extend normal watering on the following day.

Figure 3:
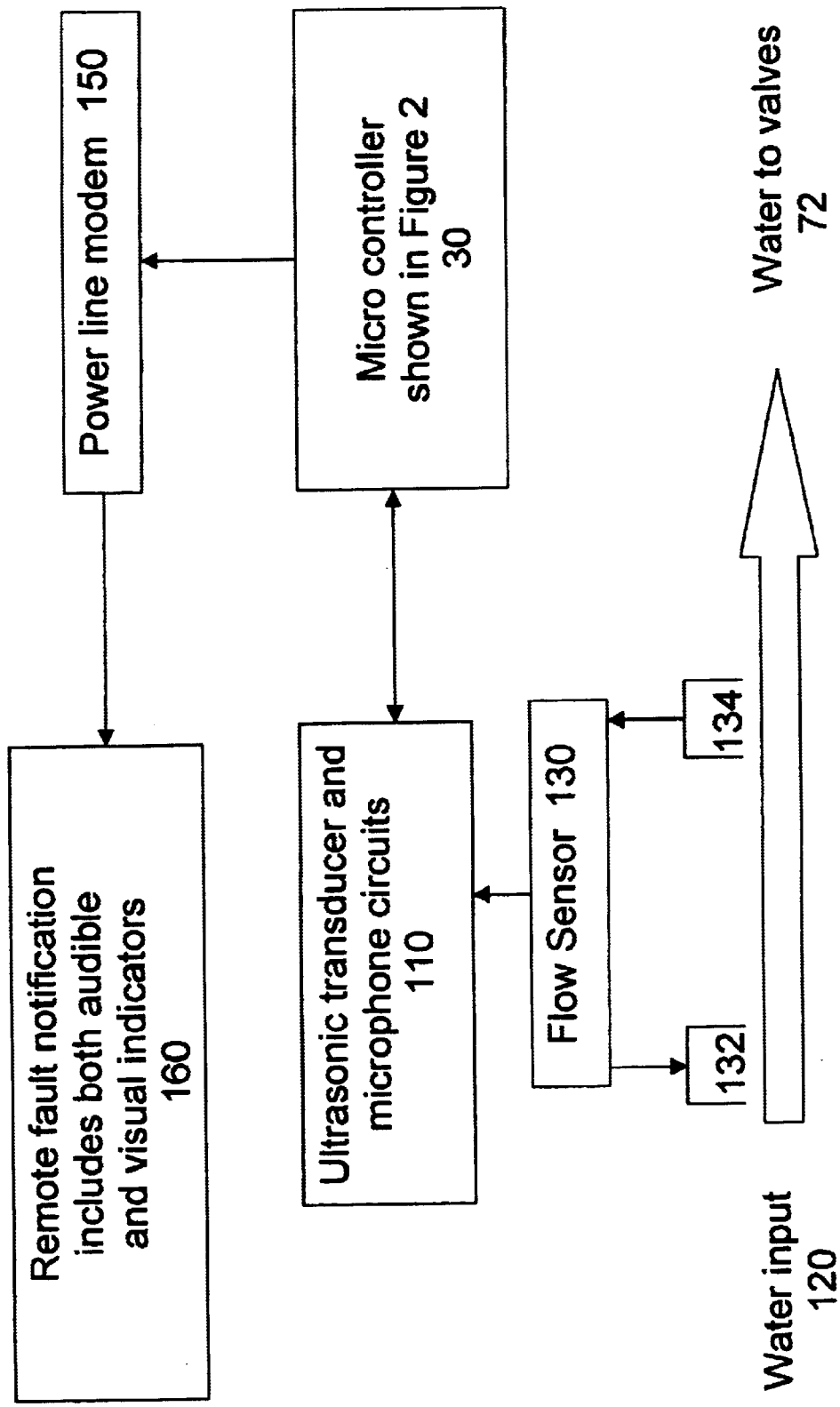
FIG. 3 shows the optional flow rate sensing and fault flagging functions.

FIG. 3 shows the operation of the flow sensor and fault flagging functions. Water 120 from the main feed source enters a flow rate sensor 130 and exits to supply all irrigation valves 72 in FIG. 2 connected to timer 7. Transducer 132 emits an ultrasonic sound into the water for pick up by microphone 134. A Doppler frequency shift is introduced as the moving water carries the sound. Transducer and microphone circuits 110 coupled thereto measure the difference between the transmitted and received frequency and passes this information to the micro controller 30. This method of measuring flow rates within existing pipes is known. An example of this method is available in Model #YD50-A series Instruments from FloCat of Kenosha, Wis. At initial installation, after all valve stations are set up for proper operation, a flow reference value is stored in non-volatile memory 40 for each stations' flow rate. Thus during each subsequent watering cycle, the current water flow rate is compared to the reference value. A fault condition is posted when the present flow rate differs from the reference value either up or down by a specified percentage.

A power line modem 150 sends the fault data over the 120 volts ac power line to a remote indicator 160 that will present both audible and visual indications to the landscape owner or maintenance personnel so repairs may be done quickly. Optionally the micro controller 30 may be instructed to shut down the station having the fault until it is repaired to prevent water waste. The posted fault condition is cleared automatically if operation of the faulty irrigation circuit is restored to its original condition or if a new reference value is stored (assuming of course that the change is by design). The preferred embodiment would use a power line modem to communicate the fault condition to the remote indicator but low power wireless techniques may also be employed. The preferred power line modem chip set is ST7536 from ST Microelectronics of San Jose, Calif.

An additional feature of the flow sensor/fault detector allows the automatic adjustment of scheduled water application to compensate for variations of water supply pressure thus applying proper amounts of water even as water delivery pressure varies.

The irrigation timer 7 may be housed in a weatherproof enclosure and installs quickly in the same locations wherein other controllers are found. No additional wiring is required unless the fault detecting/reporting option is chosen in which case the flow sensor must be installed at the main water supply and then coupled to timer 7. Alternately, existing water timers may be retrofitted with parts of this system but as that would be labor intensive and counter productive it is not seen as a preferred or viable possibility.

Up to eight control stations or watering circuits per valve control 70 are currently available in a single timer. If more stations are needed additional "slave" controllers may be installed. More valve control 70 circuits could easily be added to a single irrigation timer but it is not seen as a practical modification.

The descriptions and drawings show clearly the intent of patent coverage in the following claims. Persons with appropriate skills could easily see many variations in implementation and application of this method and apparatus. The drawings show one example of form and function. Therefore the following claims are made.

What is claimed is:

1. A method of remote and individual control of a plurality of irrigation timers to tailor water application schedules according to local area microclimates, the method comprising the steps of;
   a) collecting to a central location, microclimate weather data from a neighborhood weather station network over a wide area;
   b) applying one or more algorithms to the collected micro climate weather date to calculate current watering schedules unique to each micro climate as a function of preset criteria, and
   c) broadcasting the current water application schedules via UHF pager facilities of a local UHF pager company unidirectionally for automatic entry to a receiver at each of the plurality of irrigation timers.

2. The method of claim 1, further comprising the steps of:
   a) obtaining neighborhood microclimate weather data from local areas equipped with commercially operated systems;
   b) transfer by internet neighborhood microclimate weather data to a central processing location for calculating watering schedules;
   c) transferring by internet newly calculated watering schedules to the local UHF pager company for broadcast, and
   d) receiving the broadcast new watering schedules at each of the plurality of irrigation timers.

3. The method of claim 1, further comprising the steps of:
   a) instructing each of the plurality of irrigation timers to set current watering schedules;
   b) updating the real time dock with each new broadcast to the correct time and date, and
   c) tailoring individual watering schedules for each of the plurality of irrigation timers via manual entry of offset values to either increase or decrease watering times from those broadcast from the central control agency,
   d) Immediate messaging to individual controllers, groups of controllers or all controllers simultaneously as needed.

4. The method of claim 3, further comprising the steps of:
   a) extending manual control input to include temporary shut off for mowing, servicing or recreational use of an irrigated area, and
   b) allowing manual control to split the suggested watering schedules into multiple start times with shorter application durations for new seedings or steep slopes so as not to wash away seeds or soil.

5. The method of claim 1, further comprising the steps of:
   a) instructing each of the plurality of irrigation timers to set current watering schedules;
   b) measuring water supply flow rate with a sensor on the water main and coupling the sensor to each irrigation timer;
   c) updating the real time clock with each new broadcast to the correct time and date, and
   d) tailoring individual watering schedules for each of the plurality of irrigation timers via entry of offset values to either increase or decrease watering times from those broadcast from the central control agency in accord with sensed water supply flow rate.

6. An irrigation timer control apparatus for receiving unidirectional broadcast signals, decoding specific instructions addressed thereto and responding as instructed, the apparatus comprising:
   a) a radio frequency receiver tuned to a specific broadcast transmitter to receive, amplify and demodulate encoded watering schedules;
   b) a decryptor connected to the radio frequency receiver to unscramble encrypted watering schedules transmitted for security;
   c) a micro controller coupled to the decryptor preprogrammed with instructions to control reception, decryption, storage, manual data entry, display operation and fault detection;
   d) a real time clock coupled to the micro controller to track both time and date;
   e) non-volatile memory connected to the micro controller to store received watering schedules, timing offsets, and fault condition data;
   f) a manual input control coupled to the micro controller to personalize watering schedules and permit pauses for landscape maintenance, mowing or recreational use;
   g) a display connected to the micro controller to indicate time, date, station timing offset, and fault conditions;
   h) an irrigation valve control power supply connected to individually operate remote valve stations per received watering schedules;
   i) energy storage connected to backup the real time clock and the contents of the memory, and j) a computer program within the micro-controller to individually stagger the start times of each micro-controller thus staggering the actual start time at 16 different 20 second intervals according to the last hexadecimal digit or the last 4 binary bits of the unique serial number of each irrigation timer.

7. The apparatus of claim 6 wherein the radio frequency receiver tuned to a specific broadcast transmitter is capable of receiving from the group of at least commercial broadcaster of television, radio, pager, satellite with power and area coverage able to transmit current watering schedules.

8. An irrigation control apparatus for receiving unidirectional broadcast signals, decoding specific instructions addressed thereto and responding as instructed, the irrigation control apparatus as one of many comprising:

a) a flow sensor coupled to each irrigation control apparatus main water supply;

b) the flow sensor including fault detection of broken or missing sprinkler heads connected to the irrigation control apparatus;

c) a remote fault indicator to both visually and audibly warm of a fault condition, and d) a micro controller in the irrigation control apparatus to calculate and implement real time watering schedule changes responsive to as flow rate changes due to water supply pressure variations.

9. The method of claim 8 further comprising;

a) a power line communication link from the irrigation control apparatus to the remote fault indicator, and b) a modem access for service personnel to secure programming features via the power line communication link.

* * * * *